United States Patent [19]
Clement

[11] Patent Number: 5,305,190
[45] Date of Patent: Apr. 19, 1994

[54] LIGHTING DEVICE FOR WINDSHIELD WIPER ARMS

[76] Inventor: George W. Clement, 1408 Rosebank, Nashville, Tenn. 37216

[21] Appl. No.: 717,362

[22] Filed: Jun. 19, 1991

[51] Int. Cl.⁵ .............................................. B60Q 1/26
[52] U.S. Cl. .................... 362/83.3; 362/80.1; 362/84; 362/253
[58] Field of Search ............... 362/80.1, 83.3, 253, 362/84, 374, 375, 806

[56] References Cited

U.S. PATENT DOCUMENTS

| | | | |
|---|---|---|---|
| 2,650,355 | 8/1953 | Pieczonka | 362/253 |
| 2,675,534 | 4/1954 | Bryant | 362/80.1 |
| 4,443,832 | 4/1984 | Kanamori et al. | 362/375 |
| 4,494,326 | 1/1985 | Kanamori | 362/84 |
| 4,788,629 | 11/1988 | Handy et al. | 362/84 |

*Primary Examiner*—James C. Yeung
*Assistant Examiner*—Y. Quach
*Attorney, Agent, or Firm*—Edward D. Lanquist, Jr.; Mark J. Patterson; I. C. Waddey, Jr.

[57] ABSTRACT

This invention relates generally to an electro-luminescent strip that is placed on or integrally molded with a standard windshield wiper arm. Electro-luminescent strip is attached to housing which is placed on wiper arm by a strap, by a clip, by adhesive, or integrally molded into wiper arm. Power for electroluminescent strip is provided by an automobile battery. Power from the battery is first run through an inverter to translate the DC current into AC current. Electro-luminescent strip can also be placed into recess in wiper arm.

6 Claims, 4 Drawing Sheets

1

LIGHTING DEVICE FOR WINDSHIELD WIPER ARMS

BACKGROUND OF THE INVENTION

The present invention relates generally to a lighting device for windshield wiper arms and more specifically to a custom automotive part or after market device which is attached to or incorporated into a front or rear windshield wiper arm to provide safety and decorative illumination.

It will be appreciated by those skilled in the art that electro-luminescent lamp technology (EL lamp or strip) has been practiced for many years. The first use of EL lamps as a decorative lighting device was on the 1978 Buick Riviera. Several major automobile manufacturers have since followed with the use of EL lamps as decorative lighting members, as well as for back lighting for dashboards in many late model automobiles. It will be further appreciated by those skilled in the art that many individuals like to add custom details to their automobiles, such as vanity license plates, curb feelers, mud flaps, and brake lighting templates.

The standard automobile has at least one windshield wiper with an arm. Onto this arm, there is placed a windshield wiper blade. Unfortunately, as time goes by, automobile manufacturers are opting for the monochromatic look which causes molded plastics to be painted to match the body instead of the bright chrome of cars of the past. Not only will this monochromatic trend create lookalike sameness among automobiles, but it also decreases the ability of oncoming traffic to see the vehicle at night. This lack of night visibility is caused by the lack of illumination of monochromatic molded plastic when compared to the previously reflective chrome.

What is needed, then, is a lighting device for windshield wiper arms which increases the aesthetic appearance of a motor vehicle. This needed lighting device must also increase the visibility of the vehicle to oncoming traffic. The device must be easily attachable and versatile. This device is presently lacking in the prior art.

SUMMARY OF THE INVENTION

In the present device, an EL strip lighting device is attached to a windshield wiper arm. This attachment can be achieved by a strap, a clip, adhesive or any other releasable attachment method. An electroluminescent strip can be attached to housing which is attached to wiper arm. The wiper arm can also be manufactured with an integral lighting device. The EL strip is made of an electroluminescent lamp which is connected to the automobile electrical system through an DC/AC inverter.

Accordingly, one object of the present invention is to increase the aesthetic appearance of normally monochromatic automobile wiper assemblies.

Still another object of the present invention is to increase the visibility of a motor vehicle to oncoming traffic.

Another object of the present invention is to provide an electro-luminescent lighting device which is easily attachable to a windshield wiper arm.

Still another object of the present invention is to provide a lighting device for windshield wiper arms that is versatile in that it can be used on several different types of windshield wipers.

DESCRIPTION OF THE PREFERRED EMBODIMENT

Figure 1:
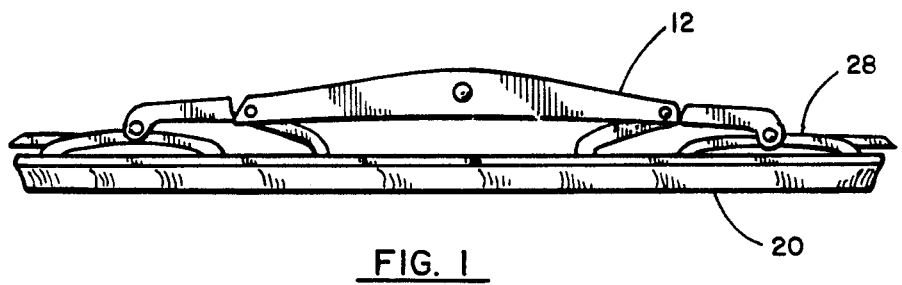
FIG. 1 is a side view of a typical windshield wiper arm.

Referring now to FIG. 1, there is shown generally at 12 a wiper arm from a standard automobile. Wiper arm 12 has brackets 28 which attach to wiper blade 20.

Figure 2A:
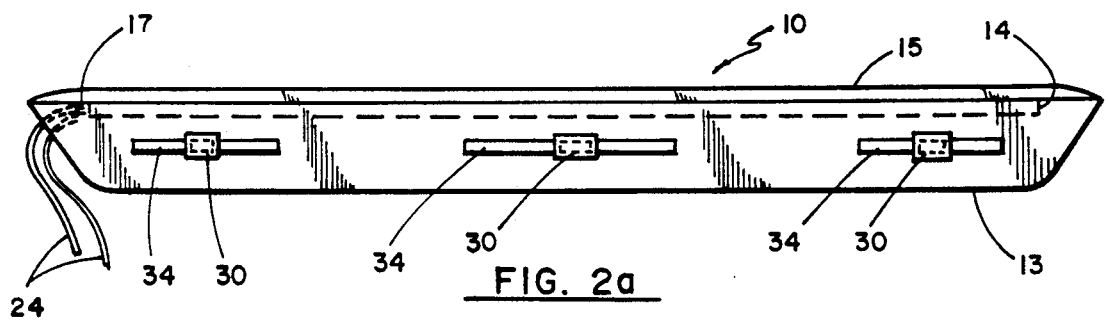
FIG. 2a is a side view of a first embodiment of the lighting device for windshield wiper arm of the present invention.
Figure 2B:
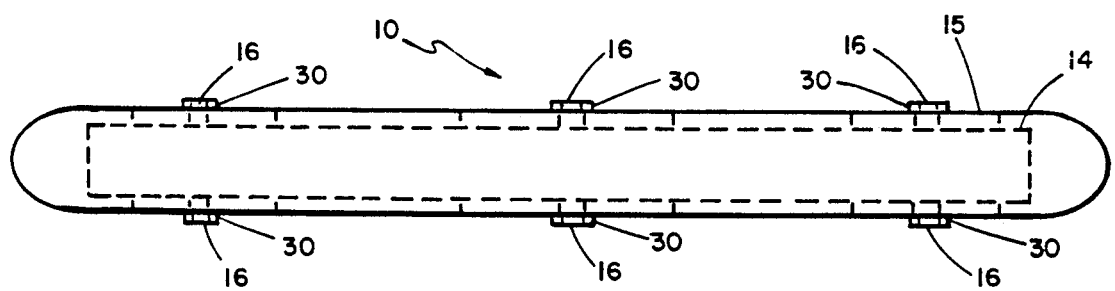
FIG. 2b is a plan view of the first embodiment of the lighting device for windshield wiper arm of the present invention.
Figure 2C:
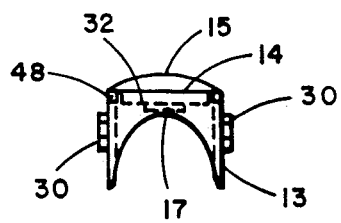
FIG. 2c is an end view of the first embodiment of the lighting device for windshield wiper arm of the present invention.
Figure 2D:
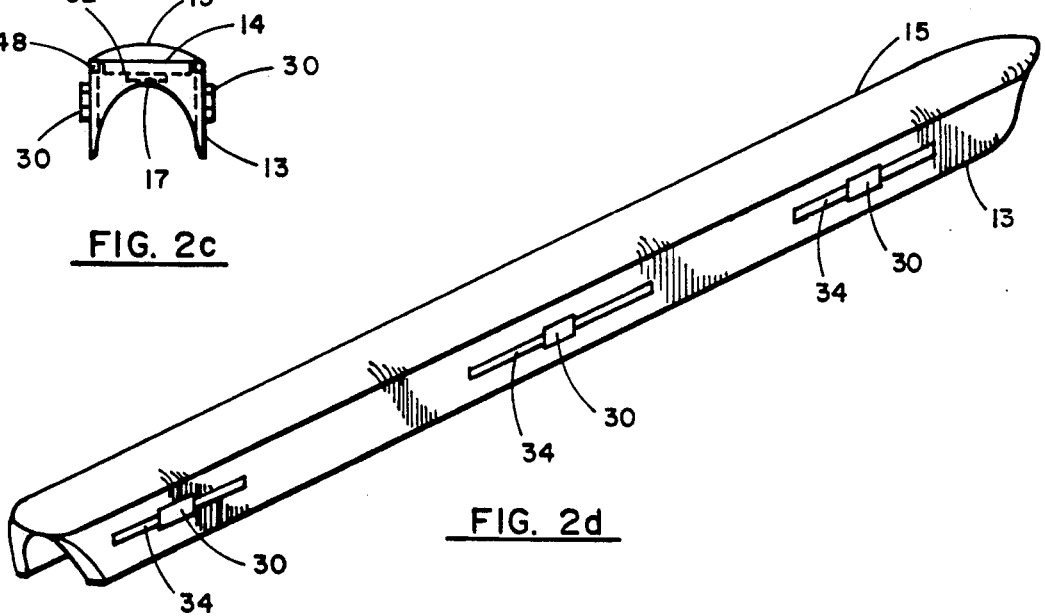
FIG. 2d is a perspective view of the first embodiment of the lighting device for windshield wiper arm of the present invention.

Referring now to FIGS. 2a–d, 3, 4, and 5, there is shown generally at 10 a first embodiment of the present invention in which the lighting device is purchased as an after market product and attached to wiper arm 12 with strap means. Device 10 has housing 13, EL strip 14, and cover 15. Housing 13 is attached to arm (12 in FIG. 1). Housing 13 includes recessed area 32 into which strip 14 is placed. Cover 15, which is transparent or translucent, is placed on housing 13 to cover strip 14. Any conventional mechanical or adhesive attachment means can be used to attach cover 15 to housing 13 as long as strip 14 is protected from exposure to the elements. As can be seen in FIG. 2c, cover 15 attaches to housing 13 proximate to aperture 48. Fasteners 30 are received by slots 34 in housing 13. In this preferred embodiment, fasteners 30 Can slide along slots 34 to adapt device 10 to wiper arms 12 of a variety of configurations. Straps 16 attach to fasteners 30. In this preferred embodiment, housing 13 is substantially eight (8) to twelve (12) inches long and substantially one-half inch tall when in position shown in FIG. 2a. Outlet 17 receives lead 24 from inverter (26 in FIG. 6).

Figure 3:
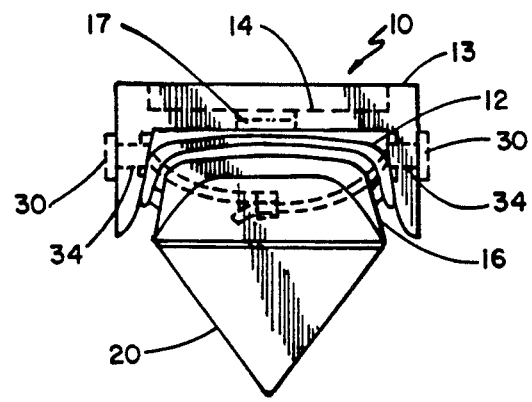
FIG. 3 is a cutaway end view of the lighting device for windshield wiper arm of the present invention as installed.
Figure 10:
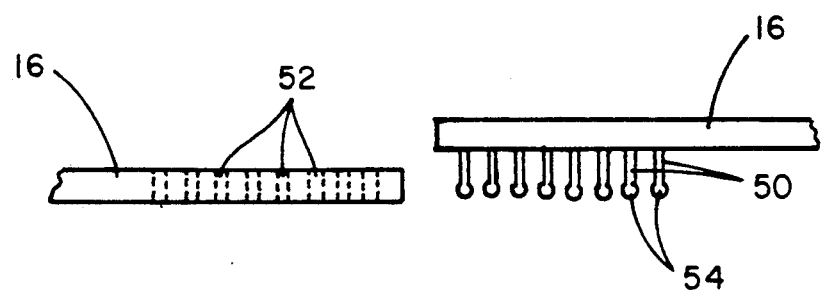
FIG. 10 is a side view of the lighting device for windshield wiper arms showing another attachment means.

Referring now to FIG. 3, there is shown generally at 10 the lighting device for windshield wiper arm of the present invention. As can be seen in FIG. 3, strap 16 attaches to housing 13 at fastener 30. Fastener 30, in turn, releasably attaches to slot (34 in FIG. 2). Strip 14 is laid over wiper arm 12 while strap 16 partially or completely encircles arm 12 to releasably attach to arm 12. Strap 16 can then be either taut or frictionally reside on top of wiper blade 20 by attaching to sides of arm 12. Slide 48 receives strap 16 frictional so that strap 16 can be stretched and held taut around arm 12. Alternately, as shown in FIG. 10, strap 16 can have holes 52 which receive prongs 50. After prongs 50 are placed through holes 52, balls 54 prevent prongs from releasing from holes 52 without human force. Mating engagement fabric or an adhesive can also be used to secure strap 16 or to secure strip 14 to housing 13 or arm 12.

Figure 4:
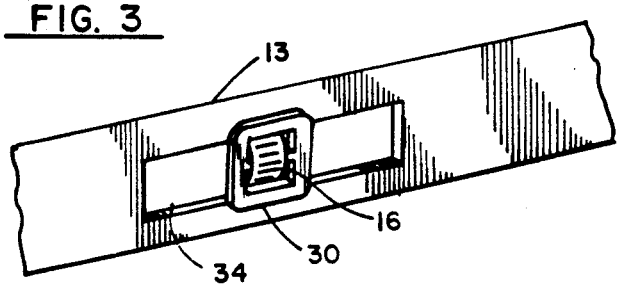
FIG. 4 is an enlarged perspective outside view of the strap attachment point of the first embodiment of the lighting device for windshield wiper arm.
Figure 5:
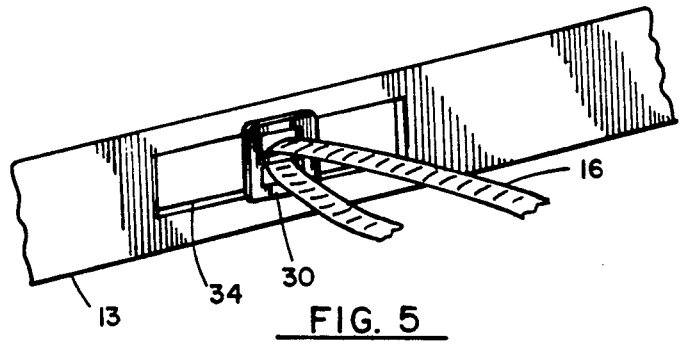
FIG. 5 is an enlarged perspective inside view of the strap attachment point of the first embodiment of the lighting device for windshield wiper arm.

Referring now to FIGS. 4 and 5, there is shown generally at 30 the fastener of the present invention. As can be seen from FIGS. 4 and 5, fastener 30 attaches into slot 34. Fastener 30 then releasably attaches to strap 16 in the preferred embodiment. However, strap 16 can fixedly attach to fastener 30 as shown in FIG. 3. Slot 34 is, of course, placed in strip 13.

Figure 9:
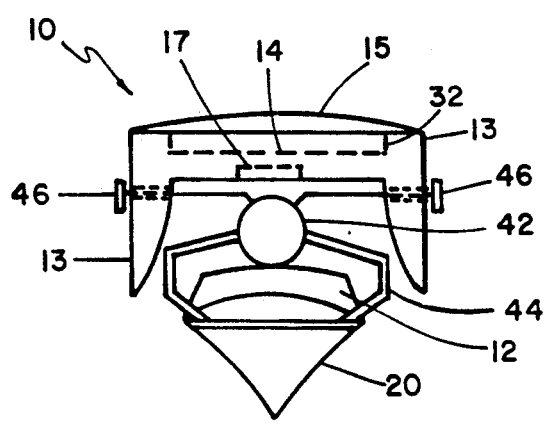
FIG. 9 is an end view of a clip used to attach the device of the present invention to a wiper arm.

Referring now to FIG. 9, there is shown generally at 10 a second after market attachable embodiment of the present invention. Device 10 has clip 42 attached to or integrally manufactured with housing 13. Clip 42 has arms 44 which releasably attach to wiper arm 12. Arms 44 are extended by applying pressure to fingers 46. Arm 12, in turn, is a standard wiper arm having blade 20. Strip 14 resides in recess 32 in housing 13. Cover 15 is then attached to housing 13.

Figure 6:
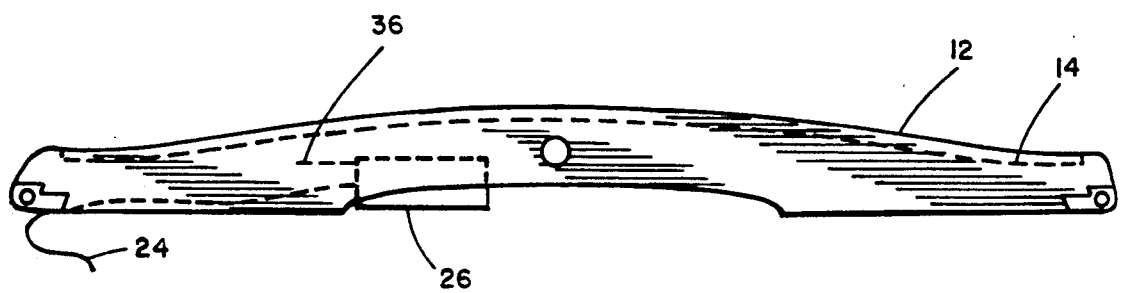
FIG. 6 is a side view of the lighting device as an integral part of the windshield wiper arm also showing the power supply.
Figure 7:
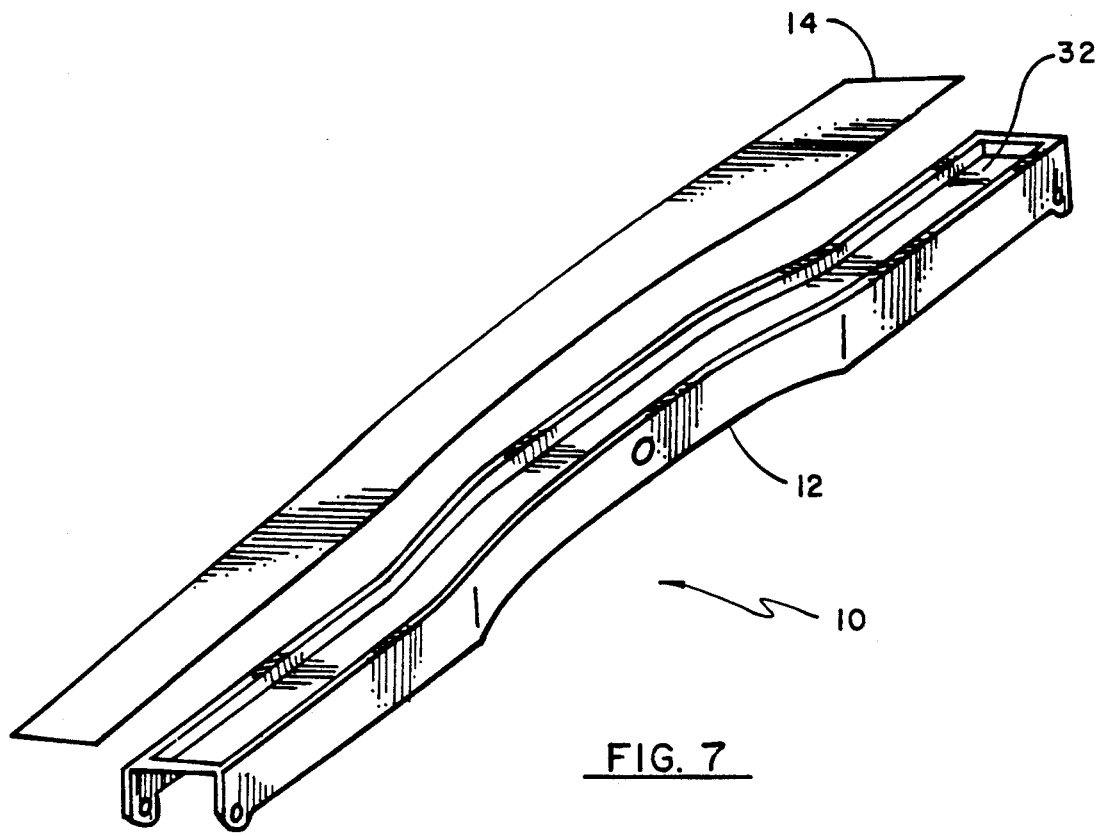
FIG. 7 is an exploded perspective view of another embodiment of the lighting device as an integral part of the windshield wiper arm.

Referring now to FIG. 6 and 7, there is shown generally at 10 another embodiment of the lighting device for windshield wiper arm of the present invention. In this particular instance, EL strip 14 is integrally molded into wiper arm 12 by provision of recess 32 in wiper arm 12. This embodiment has no need for housing (13 in FIG. 2a–d) but still may include cover (15 in FIGS. 2a–d). Arm 12 which is part of device 10 has recess 32. Into recess 32 is placed strip 14. Arm 12 can be placed on vehicle during manufacture of vehicle or can replace existing arm 12. Power to device 10 is provided by leads 24 from inverter 26 to EL lamp and leads 22 from inverter 26 to power source 40 such as the vehicle's battery. Inverter 26 attaches to slot 36 in this embodiment although inverter 26 can be attached at some other place on the host vehicle. As can be seen from comparing FIGS. 2a–d to FIG. 8, leads 24 attach to light 14 at ends or on sides. Arm 12 which is part of device 10 has recess 32. Into recess 32 is placed strip 14. Arm 12 can be placed on vehicle during manufacture of vehicle or can replace existing arm 12.

Figure 8:
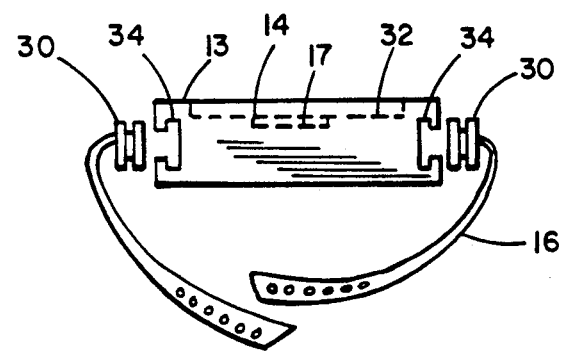
FIG. 8 is an end view of the lighting device for windshield wiper arms showing another attachment means.

Referring now to FIG. 8, there is shown generally at 10 an end view of another way of fastening strip 14 and housing 13 to strap 16. Fastener 30 attaches to slots 34 in housing 13.

Inverter 26 is merely an DC to AC inverter. Typically, strip 14 will operate 12,000 hours at 115 volts at 400 hertz. Inverter 26 isolates power supply, which is in the current embodiment a battery 40 for strip 14. A standard automobile battery 40 usually has 12 volts. The inverter then translates 12 volts DC to 115 volts AC going into strip 14.

Thus, although there have been described particular embodiments of the present invention of a new and useful lighting device for windshield wiper arms, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A system for lighting a windshield wiper having an arm comprising:
   a. an electro-luminescent lamp strip;
   b. means for attaching said electro-luminescent lamp strip to said arm; and
   c. wherein said means for attaching said electro-luminescent lamp strip to said arm comprises a strap partially encircling said windshield wiper arm; and a removable housing placed on said windshield wiper arm.

2. a system for lighting a windshield wiper having an arm comprising:
   a. an electro-luminescent lamp strip;
   b. means for attaching said electro-luminescent lamp strip to said arm; and
   c. wherein said means for attaching said electro-luminescent lamp strip to said arm comprises a clip for releasable attachment to said windshield wiper arm.

3. The device of claim 1 wherein said electro-luminescent lamp strip is integrally manufactured into said wiper arm.

4. The device of claim 3 further comprising transparent means to cover said electro-luminescent lighting member.

5. A device for lighting a windshield wiper having an arm comprising:
   a. an electro-luminescent lighting member;
   b. means to provide power to said electro-luminescent lighting member; and
   c. a clip to attach said electro-luminescent lighting member to said arm.

6. The device of claim 5 further comprising transparent means to cover said electro-luminescent lighting member.

* * * * *